United States Patent

[11] 3,537,382

| [72] | Inventor | Daniel Lambertus Moellenkamp<br>Amsterdam, Netherlands |
|---|---|---|
| [21] | Appl. No. | 772,532 |
| [22] | Filed | Nov. 1, 1968 |
| [45] | Patented | Nov. 3, 1970 |
| [73] | Assignee | Stork Amsterdam N. V.<br>Amsterdam, Netherlands |
| [32] | Priority | Nov. 6, 1967 |
| [33] |  | Netherlands |
| [31] |  | No. 6715020 |

[54] DEVICE FOR THE PASTEURIZATION OR STERILIZATION OF COMMODITIES PACKED IN CONTAINERS
2 Claims, 2 Drawing Figs.

[52] U.S. Cl. .................................................. 99/249,
99/214, 99/362
[51] Int. Cl. ............................................. B65b 55/06
[50] Field of Search ........................................... 99/249,
362, 360, 361, 363, 214, 211

[56] References Cited
UNITED STATES PATENTS

| 3,151,540 | 10/1964 | Winden .................. | 99/360 |
| 3,165,055 | 1/1965 | Winden .................. | 99/362 |
| 3,211,275 | 10/1965 | Winden .................. | 99/360 |
| 3,407,721 | 10/1968 | Carvallo ................. | 99/249 |

*Primary Examiner*—Robert W. Jenkins
*Attorney*—Waters, Roditi, Schwartz & Nissen

ABSTRACT: A device for the pasteurization or sterilization of commodities packed in containers, comprising an endless conveyor with uninterrupted main drive, a loading and an unloading station, additional driving means being provided near said stations for temporarily stopping the conveyor at these stations and subsequently accelerating it, whereby accumulation loops for the conveyor are provided before and beyond said stations.

Patented Nov. 3, 1970 3,537,382
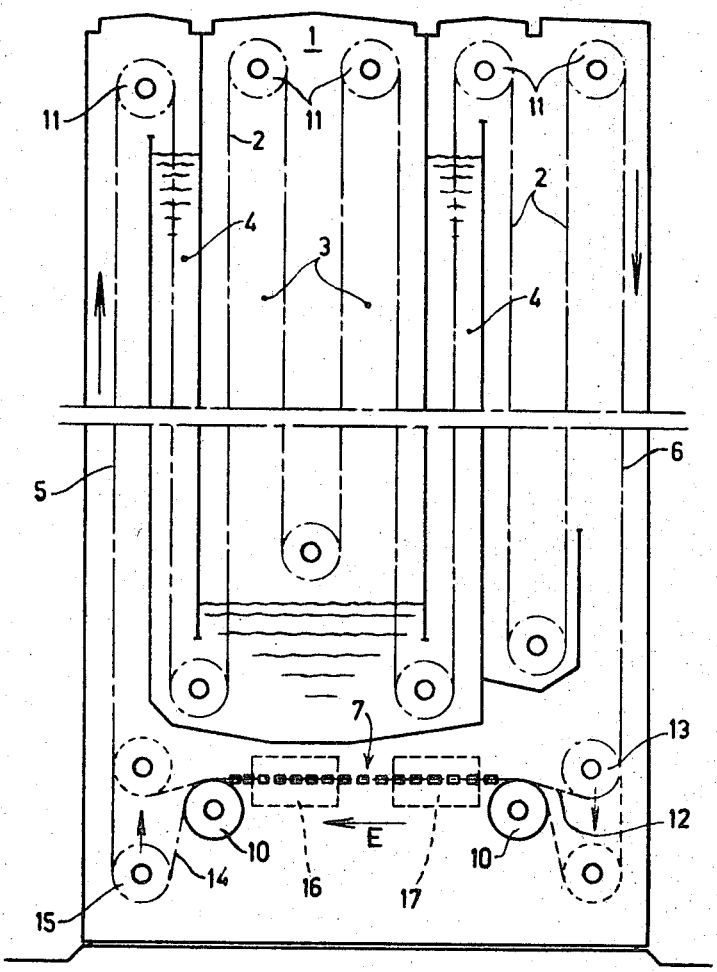
FIG:1.
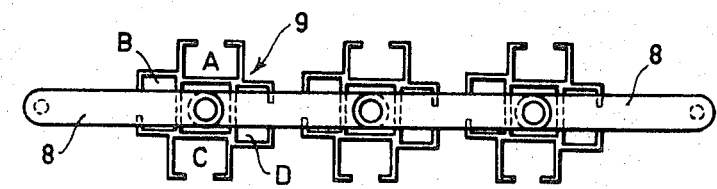
FIG:2.

DEVICE FOR THE PASTEURIZATION OR STERILIZATION OF COMMODITIES PACKED IN CONTAINERS

The invention relates to a device for the pasteurization or sterilization of commodities packed in containers, comprising a treatment space and a conveyor consisting of an endless belt or chain provided with carriers for the containers, a continuous drive being connected to the conveyor, the latter passing through a loading and an unloading station situated outside the treatment space.

Such a device is known in different embodiments in which the containers are slid (pushed) into and from the containers in a direction transverse to the direction of advance of the conveyor. An example of such a device is disclosed in the U.S. Pat. Nos. 3,165,055 and 3,151,540. In both cases special provisions are applied which are connected with the shape and construction of the carrier in order to have sufficient time available for discharging a row of juxtaposed containers from, or charging a row into the carrier.

It is an object of the invention to provide a device which independently of the shape of the carrier renders it possible to obtain a dwelling time of an adjustable lapse of time at the loading or unloading station in order to permit of the conveyor being loaded and unloaded in an undisturbed way. This object is attained according to the invention in that driving means are provided at the location of the loading and/or unloading station with which the conveyor can periodically be brought to a standstill and subsequently advanced at a faster rate, and in that on either side of the loading and/or unloading stations means are provided for temporarily accomodating and giving out again the surplus of length of the conveyor. Due to these features there are accumulation loops available at a location situated before the loading and/or unloading station as well as beyond said station(s) in order to compensate the temporal shortage or excess of the conveyor length.

The invention relates especially to a device wherein the loading and unloading station are in a horizontal track portion of the conveyor at the bottom of the device. Such an embodiment is distinguished according to the invention in that a driving wheel is provided at the beginning and at the end of said track portion and in that the means for the temporary accumulation of the conveyor, situated outside said track portion, consist of a guide wheel hanging in a loop of the conveyor. During operation of the device these guide wheels will alternately move up and down for giving out and accomodating, respectively the surplus length of the conveyor.

The foregoing and other objects and advantages of the invention will appear in the description to follow. In the description reference is made to the accompanying drawings, which form a part hereof, and in which there is shown by way of illustration and not of limitation specific forms in which the invention may be embodied.

In the drawings:

FIG. 1 is a front view of the device;

FIG. 2 is to an enlarged scale a side elevation of the conveyor.

The device consists of a treatment space 1 through which advances a conveyor 2 along a track composed of a number of loops 3. The space 1 is on either side bounded and sealed by a water lock 4 serving to maintain the difference of pressure which in operation is usually prevailing between the space 1 and the atmosphere. The conveyor 2 extends also in these water locks 4 and is further provided with outermost vertical parts 5 and 6, respectively which are interconnected at the bottom of the device by a horizontal track portion 7.

As best is seen in FIG. 2 the conveyor 2 consists of two chains 8 provided with carriers 9. These carriers are at their two ends pivotally supported on the conveyor that is to say on chains 8. Each carrier is provided with four compartments A—D for accomodating a row of containers, like e.g. tins of preserved food, glass jars or bottles, respectively. These containers are supplied and discharged from the front or rear of the device. This loading and unloading movement is therefore effected in a direction perpendicular to the direction of advance of the conveyor 2.

A loading and unloading station is provided in the horizontal track portion 7. This loading and unloading is always effected at the lowermost compartment of the carrier 9, that is to say when the compartment C is in the position as represented in FIG. 2. Unloading is conveniently effected with an endless belt or chain positioned under the compartment to be unloaded, an upstanding abutment pushing the containers out of the carrier. An analogous endless belt may be provided at the loading station, but this time it is positioned before or behind the compartment to be loaded, the arrangement being such that the row of containers on this belt is slid into the compartment via a bridge plate. In the track portion 7 means are provided for rotating the carriers 9, for instance a gear wheel or sprocket on the front of a carrier which cooperates with a rack or with another driven gear wheel.

The track portion 7 is on either side bounded by a driving wheel 10. These wheels 10 are stepwise driven independently of the main drive of the conveyor 2, the latter drive being effected by means of one or more of the upper sprockets 11. Assuming that the conveyor 2 is moving in a direction indicated by the arrow E, there is a loop 12 in the conveyor before the first wheel 10, said loop cooperating with a guide wheel 13 hanging in the conveyor. Beyond the second driving wheel 10 a loop 14 is likewise provided in the conveyor 2, with a guide wheel 15.

In the situation shown in FIG. 1 the driving wheels 10 are about to stop the conveyor 2 in the track portion 7. When this is done, the loop 12 will gradually sag and the loop 14 will gradually rise until a situation is created as represented in dotted lines in FIG. 1. At this moment the dwelling period in the track portion 7 is terminated and the driving wheels 10 are driven at a faster rate to such an extent that at the beginning of the first following dwelling period, the loop 12 is shortened and the loop 14 is sagging in a way as indicated in FIG. 1 in full lines. Thereupon the cycle is repeated and so on.

Due to a proper coordination of the stepwise drive of the driving wheels 10 and the length of the loop 12, 14 it becomes possible to realize within the horizontal track portion 7 any desired dwelling period. In this way there is sufficient opportunity at the location of the loading station 16 and the unloading station 17 for charging the containers into and discharging them from the carriers 9 in an undisturbed way.

While preferred embodiments of the invention have been shown and described, it is to be understood that changes and variations may be made without departing from the spirit and scope of the invention as defined in the appended claims.

I claim:

1. A device for the pasteurization or sterilization of commodities packed in containers, comprising a treatment space and a conveyor consisting of an endless belt or chain provided with carriers for the containers, a continuous drive being connected to the conveyor, the latter passing through a loading and unloading station situated outside the treatment space, characterized in that driving means are provided at least at the location of one of said stations for bringing the conveyor periodically to a standstill and for subsequently advancing the conveyor at a faster rate, and in that on either side of the loading and unloading station means are provided for temporarily accomodating and giving out again the surplus length of the conveyor.

2. A device according to claim 1, wherein the loading and unloading station are in a horizontal track portion of the conveyor at the bottom of the device, characterized in that a driving wheel is provided at the beginning and at the end of said track portion and in that the means for temporary accumulation of the conveyor, situated outside said track portion, consist of a guide wheel hanging in a loop of the conveyor.